Feb. 1, 1966　　　H. L. SMITH, JR　　　3,231,985
HEATING, DRYING AND CURING APPARATUS AND METHODS
Filed Jan. 15, 1962　　　9 Sheets-Sheet 6
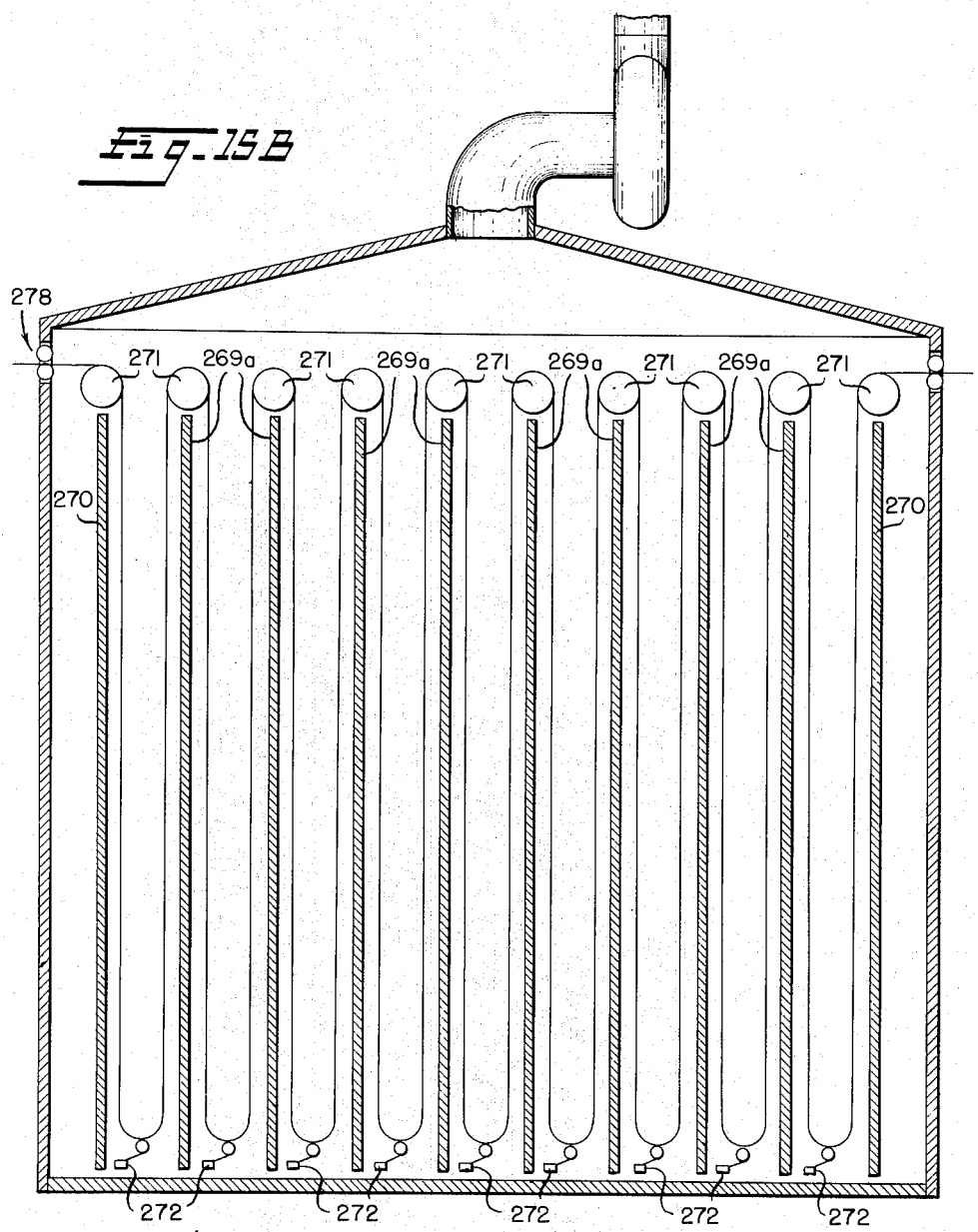
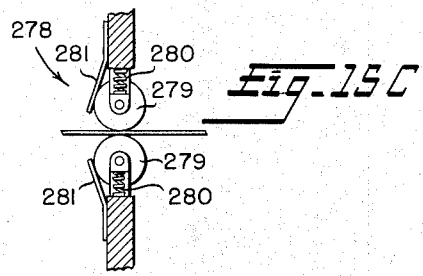
INVENTOR
Horace L. Smith, Jr.
BY　*Strauch, Nolan & Neale*
　　ATTORNEYS

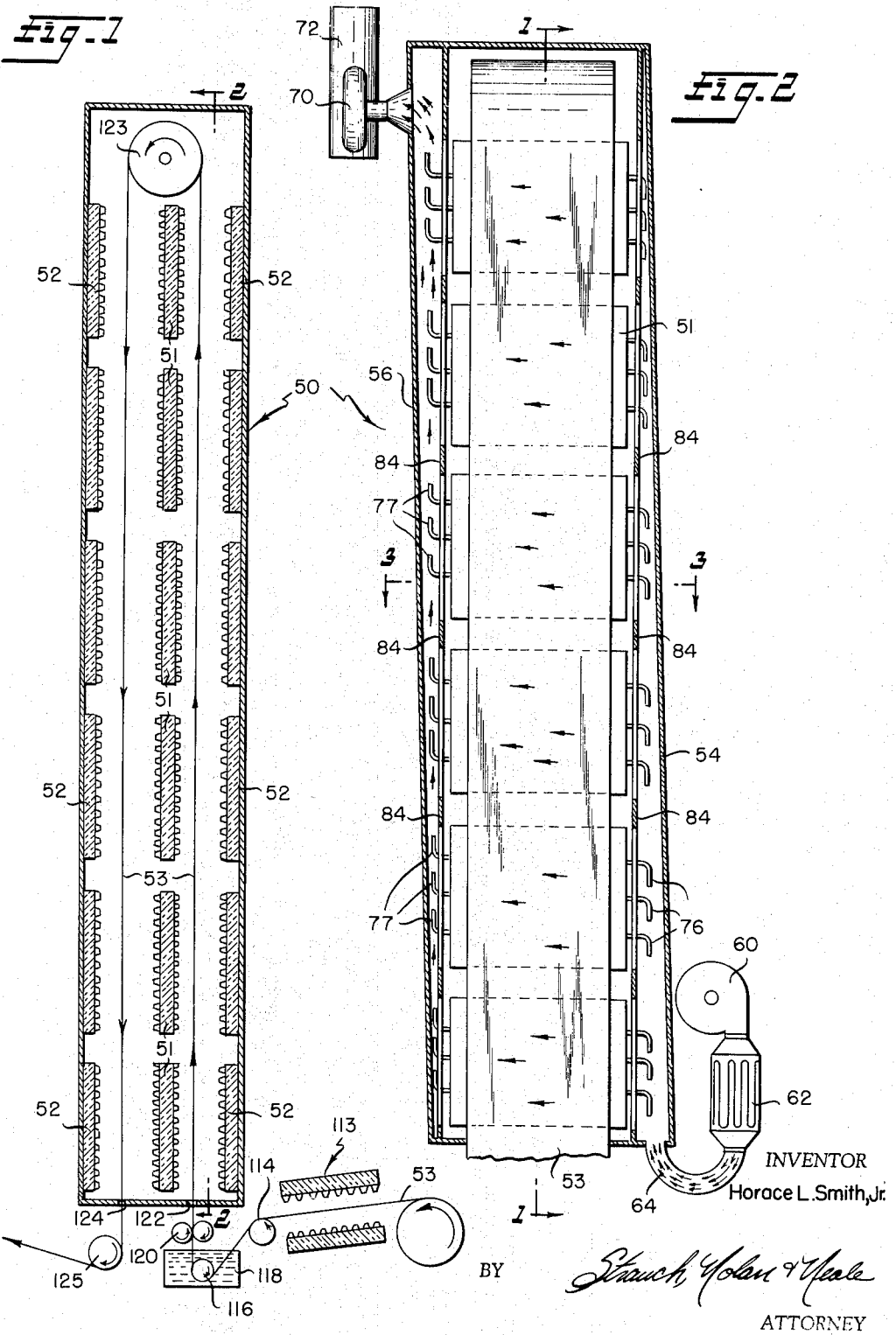

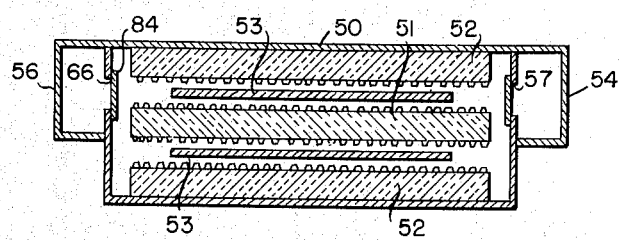
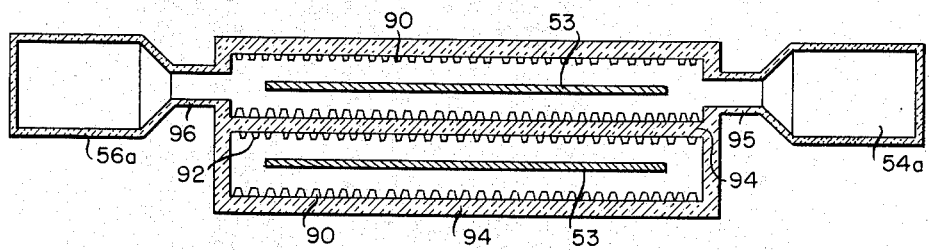
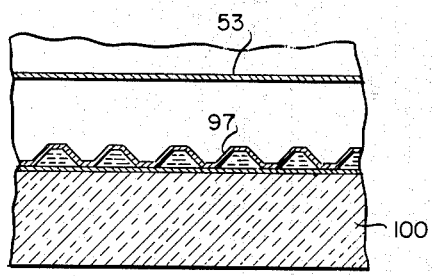
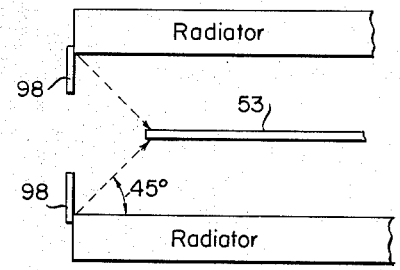
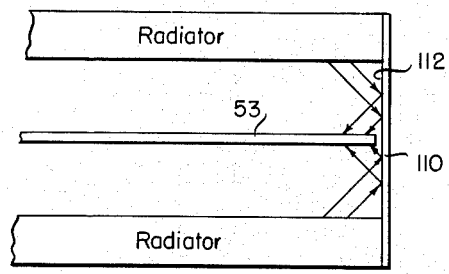
INVENTOR
Horace L. Smith, Jr.
ATTORNEYS

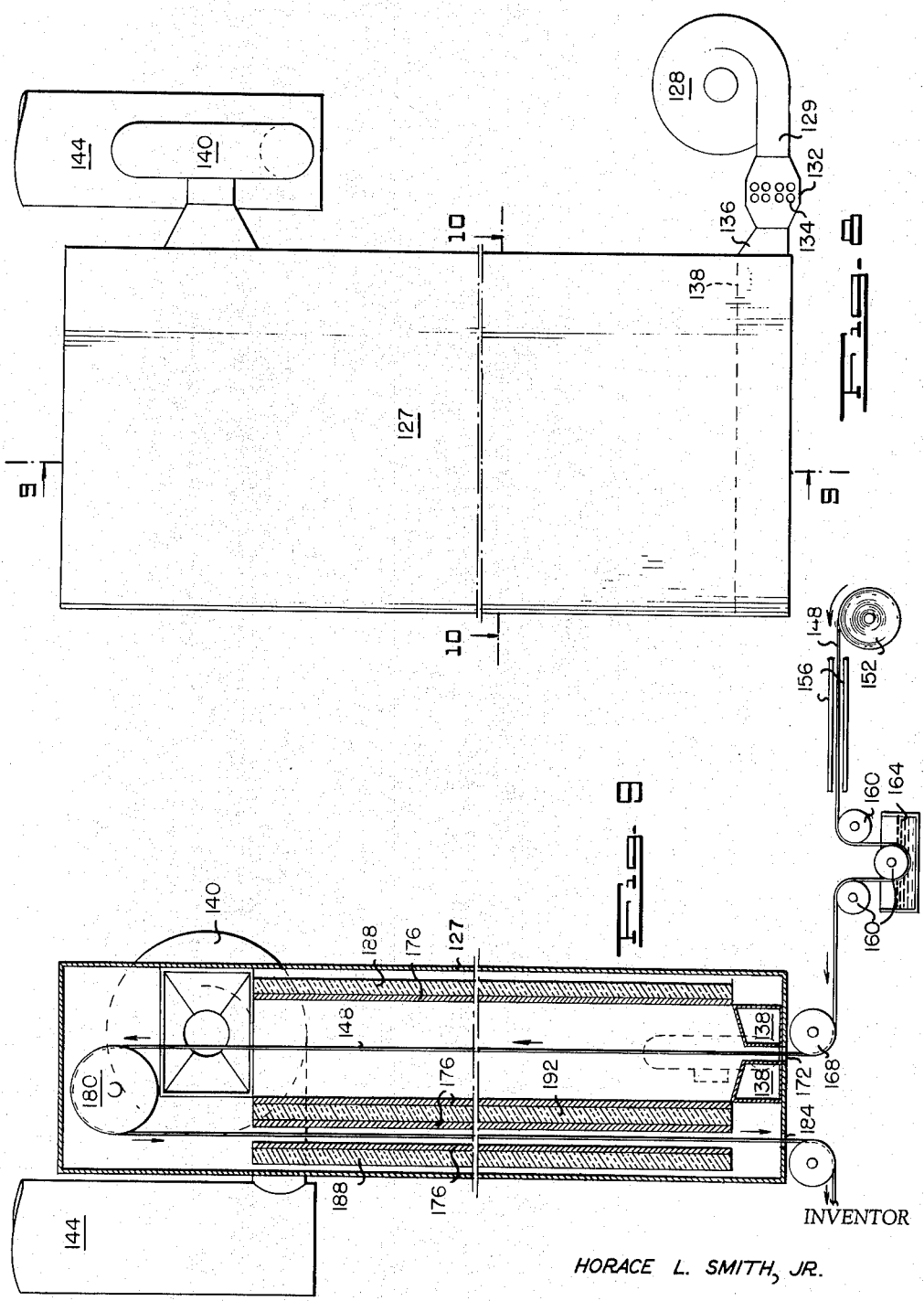

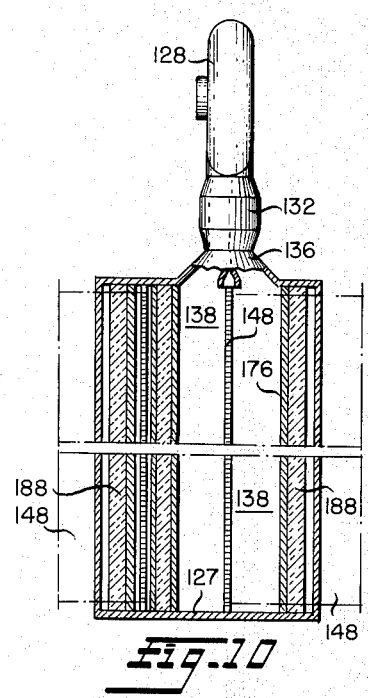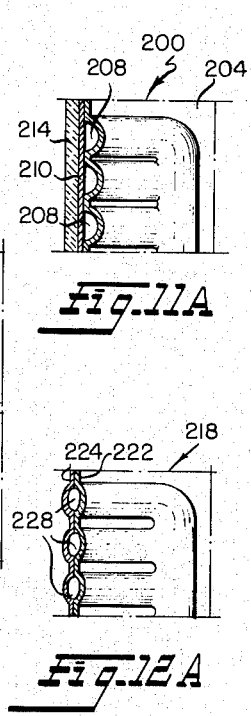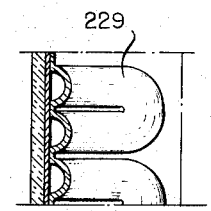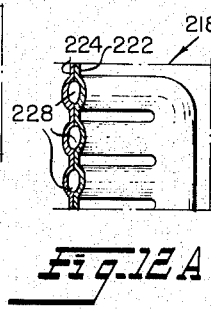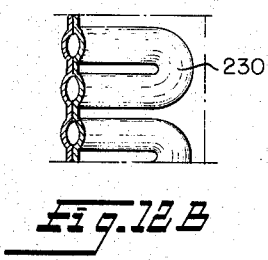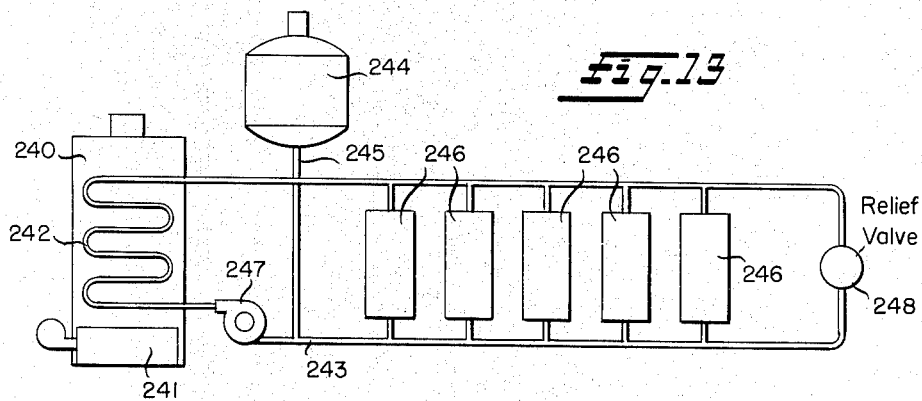

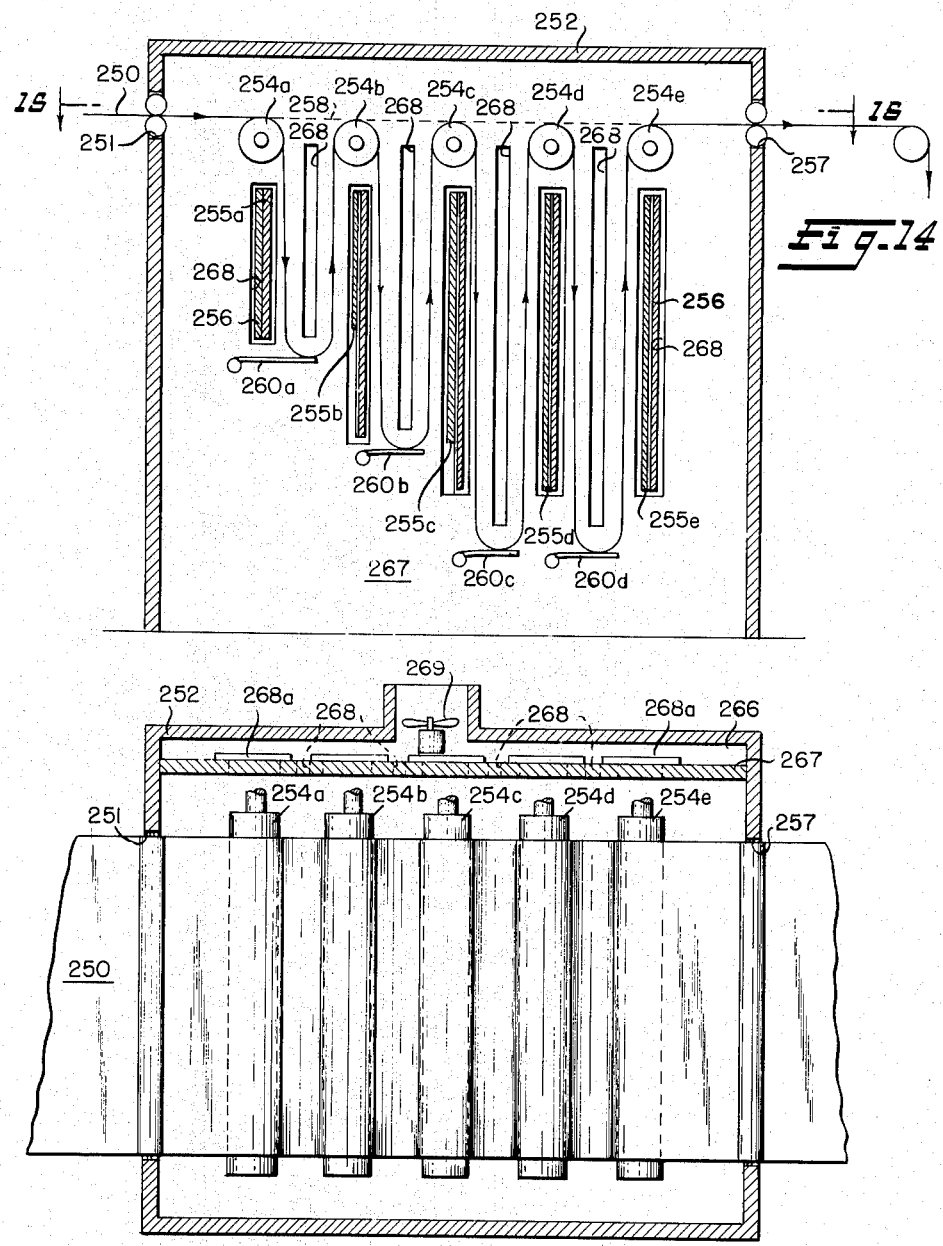

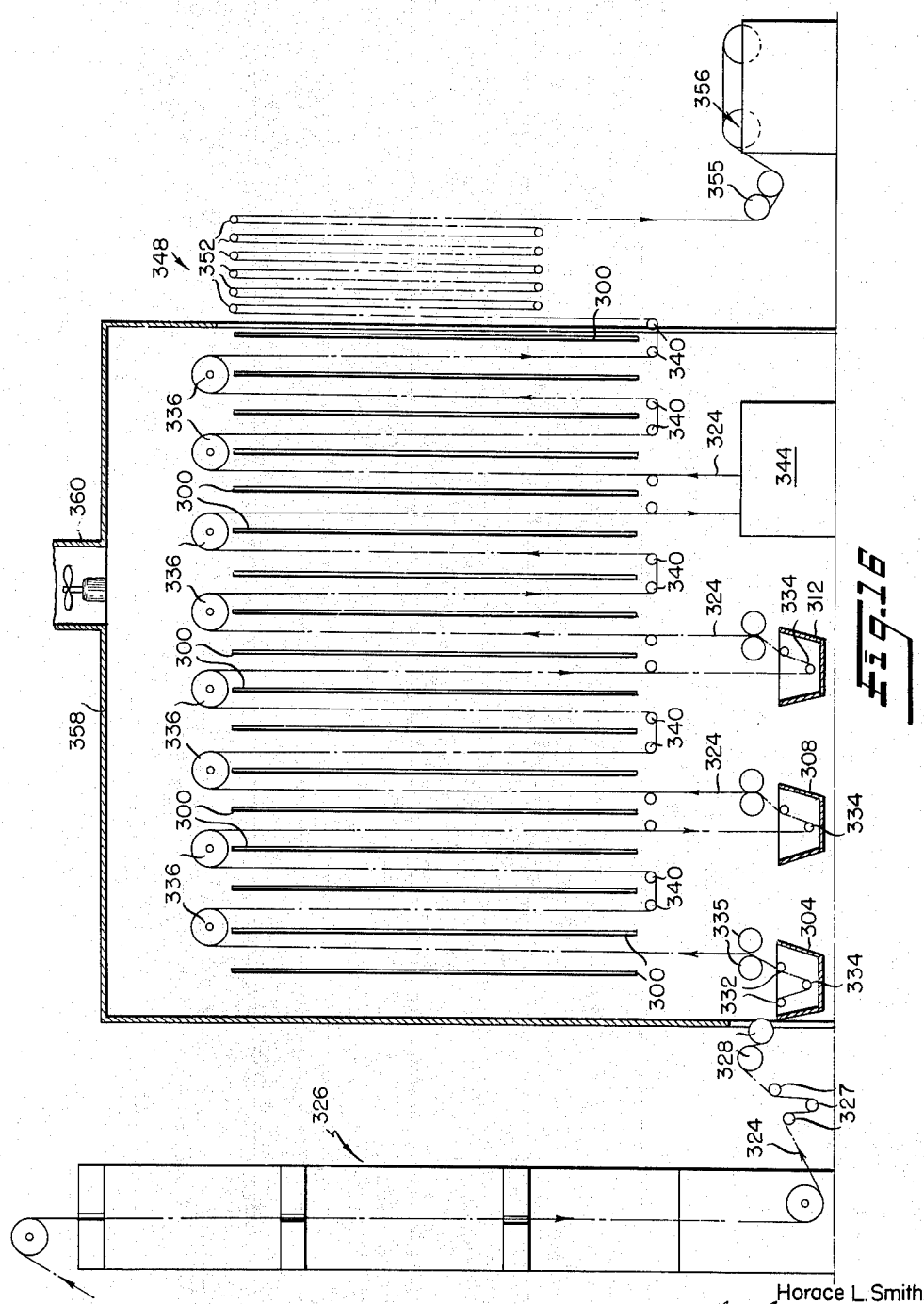

Feb. 1, 1966  H. L. SMITH, JR  3,231,985
HEATING, DRYING AND CURING APPARATUS AND METHODS
Filed Jan. 15, 1962  9 Sheets-Sheet 8

INVENTOR
Horace L. Smith, Jr.

BY
Strauch, Nolan & Hale
ATTORNEYS

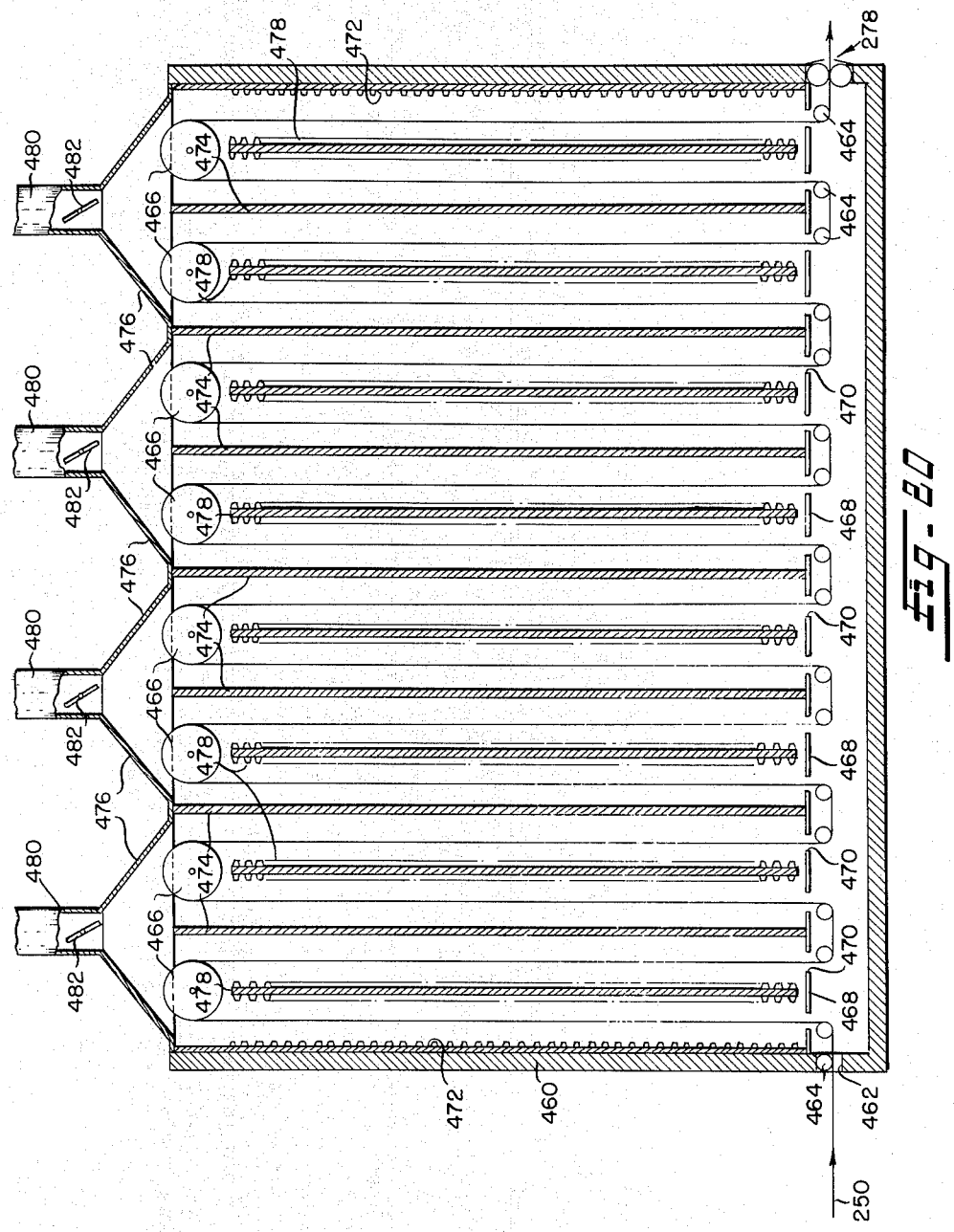

United States Patent Office 3,231,985
Patented Feb. 1, 1966

3,231,985
HEATING, DRYING AND CURING APPARATUS
AND METHODS
Horace L. Smith, Jr., Richmond, Va., assignor to Hupp
Corporation, Cleveland, Ohio, a corporation of Virginia
Filed Jan. 15, 1962, Ser. No. 166,182
10 Claims. (Cl. 34—23)

This application is a continuation-in-part of application Serial No. 64,965 filed October 25, 1960, now Patent No. 3,174,228 which is a continuation-in-part of Serial No. 846,084 filed October 13, 1959, now abandoned.

The present invention relates to improvements in apparatus for and methods of heating, drying and curing. More particularly the invention relates to novel apparatus and methods of processing web or sheet materials treated with a volatile substance, evaporation of volatile substances and removal and dilution of vapors produced by heating of web materials heated, dried, or cured in processes such as pad-steam dyeing; coronizing or elimination of organic sizing materials from glass fabrics; curing of thermoset resins; impregnation of web materials with plastics, rubbers, etc.; fixation of resin bonded dyes and pigments on web materials; and development of special designs such as lace or open area effects in resinous fabrics, tapes, webs and the like.

In producing various articles of manufacture, continuous sheet materials such as paper or metal sheet or woven or non-woven fabrics, are impregnated or coated with liquid substances such as sizings, dyes, resins and the like and then dried and/or cured by heat in order to alter or adjust the compositions and properties of the final sheet material or to impart special effects or properties. In many instances, vapor of the liquid material evolved during such drying and curing is substantially innocuous and presents no problems with regard to explosion or air-poisoning hazards by noxious fumes. In many other instances, however, the liquid or liquid solvent employed is of necessity one which on admixture with air provides an explosive mixture or which is noxious and thus unfit for human inhalation. For example, in manufacturing laminated stock, the sheet material which may be paper or textile fabric or, for example, fiberglass fabric, is impregnated with a solvent solution of a thermosetting resin such as a phenol-formaldehyde resin, or an unsaturated polyester resin, which requires benzene, acetone and/or alcohol as a solvent or vehicle to deposit the resin onto and into the sheet material. Solvents of this nature are explosive when mixed with air. Other organic solvents used in various types of textile padding or sizing operations, as for example the organic material sizing of yarn used in the weaving of glass fabric, are either combustible or explosive as vapors or, due to their noxious nature, are undesirable or intolerable air pollutants unless diluted to insignificant concentrations.

In many such web treating applications, any mechanical solid contact with the impregnated or coated surfaces of the impregnated or coated sheet prior to removal of the solvent will mar such surface and provide defective products. Thus, evaporation of a volatile substance by conductively supplied heat through direct physical contact as by steam heated rolls, is unsuitable or undesirable. For example, in a paper drying process heat rolls produce heat transfer barriers in the form of condensate layers thrown against the inner walls of the rolls by centrifugal force, and in the form of air pockets or layers entrapped between the sheet material and rolls. Sheet materials have surface roughness preventing total surface contact with heating rolls, and the presence of air pockets in the areas not in contact with the roll obstruct passage of heat from roll to sheet. As a result, the portions of the sheet in direct contact with the roll are heated to a high temperature as compared with those areas of the sheet not in contact with the roll.

It has been past practice to solve both the heat supply and volatile removal and dilution problems by passing the sheet vertically through a tower, in some cases as high as six stories by utilizing a huge volume of heated air circulating through the tower to vaporize the liquid and remove and dilute the resultant vapor to such dilution that no hazards are encountered. In this type of tower, the only physical solid contact with the sheet while it is passing through the tower is a bottom guide roll and a pulley roll at the top, over which the sheet passes and continues back to the bottom of the drying tower. In such a system, the latent heat of evaporation is transferred to the liquid on and in the sheet from heated air passed through the tower. The total volume of air required and the over-all size of the installation is dictated by the heat supply requirements rather than the vapor removal and vapor dilution requirements. As a result, this method and apparatus for evaporating the liquid and removing and diluting the volatile vapors to an innocuous state requires much greater quantities of heated air than would be required merely for vapor removal and dilution purposes. Moreover, this air and the residual heat therein cannot be reused due to the presence of solvent vapors. The supply of the latent heat of evaporation to the liquid on the sheet by connection in this manner results in inefficient heat transfer, unnecessarily large capacity and size of the tower and unnecessarily large energy consumption in circulating the huge amounts of air through the tower.

In accordance with my present invention, disadvantages of conductive and heated air heating systems are eliminated by the novel use of heat transfer by radiation which improves heat transfer efficiency and reduces the amount of air required in treating a sheet material and removing vaporous material from the treating zone. For relatively low temperature treatment radiant heaters in which a suitable high boiling point heat transfer media is circulated, are formed in accord with the particular process in which they are utilized. Sheet material being treated is passed through the field of radiation without contacting the radiators, whereby volatiles are formed and removed by passing an amount of air sufficient to remove the vapors through the treating apparatus.

Radiant heat is energy transferred by electromagnetic vibration which travels through space at the speed of light, or 186,000 miles per second. Radiant energy may be regarded as a form of wave motion with the length of the waves varying according to the temperature of the radiating source. For any given surface temperature, hot solid bodies emit radiation over a wide range of wave lengths but more energy is radiated at one particular wave length than at any other wave lengths in the range. Twenty-five percent of the total energy radiated is at a shorter wave length and 75% at a longer wave length than the wave length of the maximum radiation level. Wien's displacement law shows that as the surface increases in temperature the peak of radiation moves to the shorter wave lengths.

According to the Stefan Boltzmann law, an increase in temperature of the radiating surface causes energy to be given off at a rapidly increasing rate as a fourth power function of the absolute temperature. Steam has always been considered the most feasible source of heat for industrial purposes but it does not provide a good source of energy for radiant heating since the desired temperatures cannot be reached by steam within a practical pressure range. For this reason the present invention in certain of its applications in heating up to temperatures in the order of about 600° to 800° F., preferably utilizes a high boiling heat transfer material capable of reaching high temperatures under relatively low pressures, thus eliminating the necessity of employing equipment capable of withstanding high internal pressures created by steam or the like. For higher temperature processing the various available radiating equipment such as the well known Perfection-Schwank type heaters and flame heated radiating bodies may be used.

Every material has a different radiant energy absorption curve based on the rate of absorption over varying energy wave lengths. Most non-metallic materials have one common characteristic in that the absorption is very poor in the very short wave length band. When heat is given off from a radiant source in the longer wave length bands, it is readily absorbed by practically all material and color becomes unimportant. In the very short wave length band, black or dark colors absorb radiant energy at a much greater rate than white or light colors, but in the long wave lengths practically all materials are color blind and all have a very high rate of absorption.

Since the rate of absorption of short wave band energy by most materials is low, and the wave length is dependent upon temperature, a temperature range of between about 500° and 800° F. provides a satisfactory rate of heat output and at the same time keeps the greatest amount of energy in a wave band that is absorbed at a satisfactory rate by most host or sheet materials, except for the removal of materials such as for example, organic sizing from glass fabric.

Accordingly, it is a primary object of this invention to provide novel radiant heaters for drying and/or curing sheet members or materials impregnated in or coated on the sheet members by irradiation in which a wet sheet is moved along a predetermined path which intercepts radiation having, preferably, a peak energy emission at a predetermined wave length, for example, 2.8–7 microns.

Another object of this invention is to provide novel methods and apparatus for heating materials at any suitable temperature preferably by radiant heaters having a heat transfer medium circulated therein or having radiating elements heated by flame, or electric or other suitable heating means, in areas so ventilated that vapors produced during heating are removed in an innocuous state without undesirably affecting the heating process.

Another object of this invention is to provide an improved method and apparatus for drying and/or curing wet webs and for removing the resultant volatiles from impregnated or coated sheet materials and diluting them to an innocuous state by which the latent heat of evaporation is efficiently supplied to the liquid on the web and the volume of the vapor removing and diluting fluid may be restricted to that necessary for dilution of the volatile concentration to an acceptably low level.

A further important object of this invention is to provide an apparatus and method of volatilizing liquids and removing the resultant vapor by which the latent heat of evaporization is effectively supplied to the liquid substantially solely by radiation from a source having its peak radiation at a wave length within the maximum radiation absorption range of the base material of the web and the resultant vapor is removed by entrainment in a gaseous stream substantially thermally inert relative to and transversing the surface of the liquid so that the required volume of the stream is dictated by the rate of liquid evaporation and the required vapor dilution rather than by the heat to produce evaporation of the liquid.

It is a further object of this invention to provide a web drying or curing apparatus in which liquid evaporation is produced by heat supplied by radiant energy and in which the resultant vapors are removed by entrainment in a gaseous stream which is preferably substantially thermally inert with respect to the web and the liquid carried thereby.

It is a further object of this invention to provide a novel system, apparatus and method for removing hazardous solvents from sheet material impregnated therewith, which novel system, apparatus and method conserve motive power and heat and permit the utilization of smaller equipment for carrying out the same level of vapor removal and dilution achieved by the heat prior art equipment.

Still another object is the provision of a system, apparatus and process for heating and/or curing sheet material formed in festoons in a novel manner, and radiant heated and ventilated in accord with this invention.

Further objects and advantages will become apparent from the following detailed description of the invention and appended claims taken in conjunction with the attached drawings in which:

FIGURE 1 is a side elevation view in section taken along line 1—1 of FIGURE 2 illustrating details of a heat treating tower constructed in accord with the principles of the present invention;

FIGURE 2 is a front elevation view in section taken along line 2—2 of FIGURE 1;

FIGURE 3 is a horizontal section taken along line 3—3 of FIGURE 2;

FIGURE 4 is a view similar to FIGURE 3 illustrating the cross sectional details of a modification of the present invention;

FIGURES 5 and 6 are diagrammatic illustrations of a preferred relationship between sheet material being treated and one or two radiators respectively;

FIGURE 7 is a diagrammatic illustration of another embodiment of the present invention wherein a pair of radiators are spanned at their ends by a reflector plate, and sheet material is passed between the radiators;

FIGURE 8 is a front elevation view of a modified heat treating tower;

FIGURE 9 is a vertical side sectional view of the tower shown in FIGURE 8 taken along line 9—9 thereof;

FIGURE 10 is a horizontal sectional view taken along line 10—10 of FIGURE 8;

FIGURES 11A and 11B are perspective views of portions of parallel and serial fluid flow radiators with single radiating surfaces;

FIGURES 12A and 12B are perspective views of portions of parallel and serial fluid flow radiators having radiating surfaces on opposite sides thereof;

FIGURE 13 is a diagrammatic illustration of one type heat transfer media flow system to supply the radiators of FIGURES 11A to 12B;

FIGURE 14 is a diagrammatic illustration of heating and/or curing apparatus utilizing radiant heaters in accordance with the principles of the present invention wherein festoons of the material being treated are formed between pairs of radiators;

FIGURE 15A is a horizontal section view taken along line 15—15 of FIGURE 14;

FIGURE 15B illustrates a modification of the apparatus shown in FIGURE 14;

FIGURE 15C is an enlarged view of a roller seal as utilized for example, in FIGURE 14;

FIGURE 16 is a front elevation view partly in section diagrammatically illustrating a textile padding process and apparatus wherein the textile is heated by various banks of radiators in accordance with the principles of the present invention;

Figure 17:
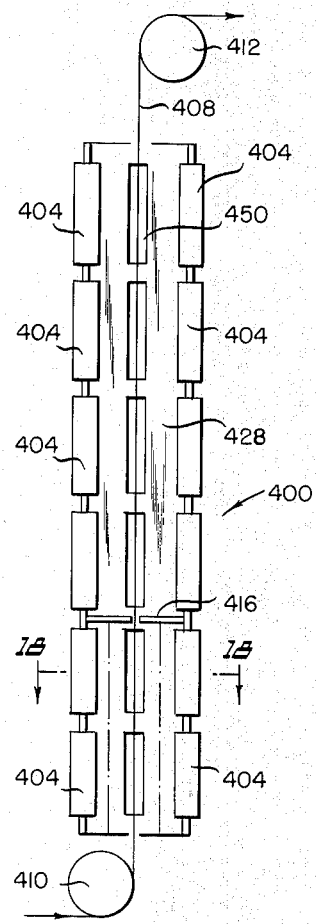
FIGURE 17 is a diagrammatic front vertical section of another embodiment of apparatus to practice certain phases of my invention.

In a referred embodiment of this invention a system, apparatus and process are provided for removing hazardous and/or otherwise noxious volatile materials from sheet materials utilizing novel radiant heaters in a manner to be described whereby the volatile materials are rendered substantially innocuous. One or more surfaces of a sheet material are treated as by coating and/or impregnation and supported without substantially mechanically disturbing the treated surface(s) thereof. Radiant heat is applied to the supported sheet material to volatilize the volatile materials therein. Concurrently with heating, a sufficient quantity of air is passed over the treated sheet material to remove the vaporized volatile material and render it innocuous by dilution. The air which is directed over the heated sheet is preferably at a temperature at which it is thermally inert with respect to the liquid on the sheet or web, that is at a temperature that is substantially equal to or only slightly above the boiling point of the liquid at the pressure involved which is normally atmospheric pressure. The air temperature should be such that the vapors of the volatile material will not be condensed upon contact with the air being passed over the impregnated sheet material but need be no higher as a higher temperature merely results in an increase in the residual heat loss, decrease in overall efficiency, and increase in the possibility of explosion when the vapor is combustible.

Referring now to the drawings, FIGURES 1–3 illustrate a preferred embodiment of this invention wherein a solvent removal tower 50 is shown embodying the principles of this invention. Radiators 51 and 52, which may be any suitable radiant heaters, are positioned in vertically spaced banks in tower 50 so that sheet material 53 may pass upwardly and downwardly in the tower with radiators facing both sides thereof. As shown diagrammatically in FIGURES 1–3, radiators 51 have radiating surfaces separated by an insulation layer, whereas radiators 52 have only a single inwardly facing radiating surface and an outwardly facing insulation layer.

Tapered plenum ducts 54 and 56 for air inlet and exhaust respectively are located on opposite sides of tower 50 and are adapted to direct air across the tower apparatus. Inlet duct 54 has a large cross sectional area at its bottom and tapers toward tower 50 into a smaller cross sectional area at its top while outlet duct 56 is reversely disposed. Duct 54 is closed on three sides as shown in FIGURE 3, and is open to the interior of tower 50 along its length through longitudinal opening 57 extending along a side of tower 50 which is substantially perpendicular to sheet material 53 as it passes through the tower. The bottom of duct 54 is open and is connected with an air inlet fan 60 through air preheater 62 and conduit 64 as shown in FIGURE 2.

A longitudinal opening 66, similar to opening 57 connects duct 56 with tower 50 whereby air traveling from inlet duct 54 across the tower may be exhausted through duct 56 by exhaust fan 70 and vent 72 located at or near the top thereof.

Air introduced into duct 54 from conduit 64 is guided by a series of spaced apart vanes 76, through opening 57, horizontally across tower 50 in a direction substantially paralleling the plane of sheet material 53 as illustrated by arrows in FIGURE 2. Having crossed the tower preferably on both sides of the sheet material, the air enters duct 56 through opening 66 and is exhausted. Suitable baffles 77 may also be provided in outlet duct 56 for directing air coming from tower 50 upwardly for exhausing through vent 72. Ducts 54 and 56 being tapered, are adapted to afford relatively uniform inlet and exhaust air pressures throughout their lengths so that the flow of air across the lower portion of tower 50 is not greatly different from that flowing across the upper portion. At such vertical radiator spacing, a plate 84 is positioned over duct inlet and outlet openings 57 and 66 for support and to block off air flow across tower spaces not immediately adjacent a radiator so that optimum use of the inlet air will be achieved.

In FIGURE 4, a modified form of a tower is shown wherein radiators 90 and 92 are positioned against walls of insulating material 94 constituting the construction walls of the tower. Additionally, tapered ducts 54a and 56a are provided with narrow passageways 95 and 96 respectively through which heater air enters and exits the tower.

FIGURES 5 and 6 illustrate in detail the relationship of a radiator 97, sheet material 53, and insulating material 100. The radiator surfaces may be coated with a dark substance which is permanent, but will not act substantially as an insulator. A preferred coating material is a thin fused glass surface of the order of .001 to .003 of an inch thick applied as a frit permanently bonded to the metal surface and providing an emissivity of 0.98 at 600°–800° F. Other somewhat less effective coatings include for example, a heat resistant silicone base paint containing a dark pigment such as lamp black thus providing the radiator surface with a high emissivity coefficient, e.g., as high as about 0.93 in the temperature range of 500° F. to 800° F. Such radiators emit a much larger amount of energy, for example, as measured in B.t.u. per square foot of radiating surface, than the uncoated surfaces.

FIGURE 6 diagrammatically illustrates how, in accordance with this invention, the entire area of sheet material 53 is irradiated by providing radiators substantially wider than the width of the sheet material. As shown, the radiator elements extend beyond the width of the sheet to an extent such that a line (shown in dotted lines) between the outer radiator edge and the outer edge of the sheet material will be no greater than about 45° from the radiator. If desired, reflectors 98 may be provided on one or both sides to inwardly deflect radiation which would otherwise miss material 53. The reflectors preferably terminate short of each other so that cross ventilation gases may pass between the radiators and the material under treatment may be inspected without obstruction by the reflectors. The reflectors insure uniformity of heating over the sheet material surface.

In FIGURE 7, another radiator arrangement is illustrated for assuring uniform heating over the entire surface of sheet material 53. An end reflecting piece 110 is provided having a reflective surface 112 disposed across the ends of the radiators. Thus, instead of widening the radiator elements as their distance from the sheet is increased, reflecting piece 110 may be used to reflect diffused radiation back to the sheet material.

The improved solvent removal efficiency provided by the present invention permits use of much smaller towers of the type described, with or without an outlet fan, depending upon the size of the tower employed and the type of solvent being evaporated. Less air and air-moving power will be required for a solvent requiring little air dilution in order to render it safe for removal and discharge, than in the case where the solvent is of a type needing large volumes of air to dilute it to a safe level.

In utilizing tower 50 (FIGURE 1) for drying or curing, sheet material 53 is transmitted through a preheater 113 comprised of radiators or other suitable heating devices. Next, the sheet is passed over rollers 114 and 116 through treating bath 118 or through other treating devices as desired depending upon the process involved, i.e., dyeing, resin impregnating, etc. From bath 118 the sheet passes between guide rollers 120 (which may, if desired, be spaced sufficiently close as to regulate the amount of liquid carried by the sheet material into tower 50) through opening 122, around roller 123, out through tower opening 124 and over roller 125. As sheet material 53 travels through the tower, the radiators cause volatilization of materials on the sheet which are then removed by air passing through the tower.

As an example of radiant heating and/or curing, consider a process wherein sheet material, either paper or fabric, is impregnated with a thermosetting resin. Preheater 113 shown in FIGURE 1 pretreats the material prior to impregnation by operating at temperatures sufficient to remove moisture. The resin is applied to the web in solution with methanol, toluol, or any other compatible solvent, after which the solvent must be removed and the resin cured through the "B" stage.

Insurance requirements usually dictate dilution of the solvent vapors to reduce fire or explosive hazards and although dilution needs will vary with different solvents, 10,000 cubic feet of fresh air for each gallon of solvent evaporated is a good rule of thumb. The ventilating air for solvent vapor removal is supplied only in sufficient quantity required to satisfy insurance and safety conditions, and is preheated only to the solvent boiling point temperature. Therefore, in this example, the ventilating air would be preheated to 150° F. so that it neither heats nor cools in passing over the web material, but simply entrains the vapors and carries them away.

Regardless of how heat is added to the web material, the temperature thereof can never exceed the atmospheric boiling point of the solvent being used as long as solvent remains in the web material. Thus, if methanol having a boiling point of 150° F. is used the temperature of the web material cannot exceed 150° F. until all methanol has been removed. However, by employing radiant heaters operating, for example, at 550° F. to provide a high heat flux density, the latent heat of solvent vaporization is quickly supplied to the web material.

Efficient web heating and ventilating is further enhanced by passing the air across the web material, i.e., essentially perpendicular to the direction of web movement. This causes the air to be in contact with the radiators for the shortest possible period of time and still pass over the web material, so that very little heat is added to the air. Moreover, since the air is moving across, rather than in a direction parallel to sheet movement, relatively high scrubbing or scouring velocities are obtained to further expedite evaporation.

It is preferred that the tower be sufficiently high and the radiation applied at a rate such that all solvent in the web material will be evaporated during upward travel of the web material so that it will be necessary to ventilate only one side of the tower. When this is done, radiators facing the web material during its downward movement may be operated at reduced temperatures to heat cure the resin as desired, which is through its "B" stage in this example.

The solvent removal and dilution towers as described above need not be vertical but can be horizontal if desired. For example, the same arrangement of radiators and ventilation inlets and outlets illustrated in the vertical towers may be used with only minor modifications, if necessary, to conform the heater arrangement to the catenary web curvature between rollers. If the material being processed is coated or impregnated only on one side any suitable supporting rollers may be used in contact with the dry side. If the material is thoroughly impregnated or coated on both sides then it should not be permitted to contact any supporting roller or direction changing roller until the surface has dried to a point that it will not transfer material to the roller or cause a build-up of product on the rollers. The limits of distance between supports for the horizontal material are preferably established by the permissible tension in the product and sag at the midpoint between rollers.

In another embodiment of this invention illustrated in FIGURES 8–10, a solvent removal tower embodying the principles of this invention is shown comprising a vertical enclosed tower structure 127 having at its bottom an air supply fan 128 which forces air through a conduit 129, through an air preheater 132 having heating elements 134 therein, and thence to an air manifold 136 which communicates with open top air plenums 138 in the bottom interior of tower 127. An air exhaust fan 140 communicates with the top interior of tower 127 and draws air therefrom and passes it to a vent stack 144 which communicates with the atmosphere and thus discharges vapor-air mixtures from the tower.

In FIGURE 9, tower 127 is shown in use with an impregnating system. Sheet material 148 is fed from a roll 152 through a preheater 156 and is guided by means of guide rolls 160 through an impregnating tank 164 and then to a bottom guide roll 168 which directs the treated sheet upwardly through an inlet slot 172 in the bottom side of tower 127. In the right-hand side of tower 127 as viewed in FIGURE 9, radiant heaters 176 are aligned substantially parallel to, and on each side of sheet material 148. A pulley roll 180 at the top of tower 127 reverses the direction of sheet material 148 which then descends between substantially aligned radiators 176, and exits through a tower outlet slot 184. The surfaces of radiators 176 which face outwardly of tower 127 are advantageously covered with a suitable heat insulating material 188 to prevent escape of heat from the tower. The two innermost radiators may also be separated by heat insulating material 192 so as to permit operation thereof at different temperatures, and operation of each pair of radiators facing each other at a common temperature.

Radiators 176 need not be of any particular construction as long as they are capable of radiating high intensity radiations of suitable wave length; however, in accordance with this invention particularly advantageous forms of radiators are illustrated in FIGURES 11 and 12 which respectively show a radiator having one radiating surface, and a radiator having two opposite radiating surfaces. Referring to FIGURE 11A, there is shown a one-way radiator 200 comprising a formed sheet metal facing 204 having corrugations defining communicating channels 208, a metal sheet 210 welded to the formed sheet metal facing 204 to enclose channels 208, and an insulating sheet 214 secured to the opposite face of said metal sheet 210. A two-way radiator 218 shown in FIGURE 12A, comprises two formed sheet metal facings 222 and 224 having corrugations defining half-channels and which are welded together to form enclosed, communicating channels 228. The outer radiating surfaces of the formed sheet metal facings 204, 222 and 224 can be treated with any suitable substance having a high coefficient of emissivity to increase the rate and intensity of heat radiations emitting therefrom.

FIGURES 11B and 12B show single and double surface radiators respectively and are therefore similar to the radiators of FIGURES 11A and 12A, but the tubular channel forming members 229 and 230 respectively constitute a single continuous channel in which serial flow is achieved. Alternately if desired a pair of such channel members may be provided on each radiator and countercurrent flow fluid set up through them to produce substantially uniform radiation over the entire radiator surface. Application of radiant energy in this manner has several advantages and is more fully explained in my copending application Serial No. 118,439 filed June 20, 1961, now Patent No. 3,181,605, which is hereby incorporated by reference in its entirety as if fully set out in this specification.

A high boiling heat transfer fluid heated to a high temperature, e.g., 550° to 800° F. is circulated as illustrated diagrammatically in FIGURE 13, through channels 208 and 228 to bring the radiating surfaces of radiators 200 and 218 to the desired radiating temperature.

The heat transfer fluid preferably has the properties of being liquid, non-flammable, non-corrosive, and having a low viscosity at operating temperatures. Suitable high boiling heat transfer liquids are the liquid chlorinated hydrocarbons, e.g., Aroclor, which is essentially tetrachlorobiphenyl, biphenyl ether, and the like.

In FIGURE 13 a circulation system for a series of radiators of the type shown in FIGURES 11 and 12 diagrammatically illustrates the principles involved in circulating liquid through radiators in use in towers 50 and 127 for example. As shown in FIGURE 13, a heater 240 comprising a burner 241 and associated heating coils 242 are connected to a piping network 243. A vented expansion tank 244 is connected to piping network 243 by pipe 245 to permit expansion and contraction of heat transfer fluid within the piping network and radiators 246, and at the same time avoid excessive strains on the network, radiators, heating coils and other associated equipment. A circulating pump 247 moves the fluid within the system, and a differential pressure relief valve 248 releases to maintain a predetermined minimum circulation through the system to prevent damage to the liquid passing through the heater due to overheating. A minimum circulation through the heater of about eight feet per second with a liquid such as Aroclor has been found to be desirable. The heat transfer fluid is heated in coils 242 and circulated to radiators 246 where it delivers its contained heat and then returns to the coils, pump 247 providing any necessary fluid moving forces. It is therefore apparent that any suitable arrangement including heater and circulating conduits may be employed to circulate hot fluid through the radiators.

In the current production of glass fabrics, organic sizing material embodying constituents of different volatilities is applied to the individual ends of yarn which acts as a mechancal lubricant so that the fibers do not injuriously abrade the glass fiber heddles and other equipment. The sizing is removed from the sized woven fabric or greige goods by high temperature volatilization and oxidation when desirable, and the desized coronized and set fabric is then dyed, resin impregnated, or otherwise finished for commercial purposes depending upon the intended end use. In certain of the current desizing and coronizing processes, burning of the evolved combustibles occurs on the fabric surface with actual flame temperatures of as high as about 2300° F. in contact with the fabric resulting in adverse discoloration, considerable weakening of the fabric strength and resultant deterioration of market value of the final product.

The current commercial glass fabric desizing, coronizing and setting processes temperature ranges and equipment and their relative advantages and disadvantages are disclosed in U.S. patents to Klug 2,633,428; Wagoner 2,845,364; May 2,970,934; Caroselli 3,008,846; and Lotz 3,012,845.

My present invention includes novel treating methods and apparatus for use in curing, drying, setting and otherwise treating sheet or web materials coated or impregnated with materials containing combustible volatile constituents in the drying paints, lacquers, sizings and the like on sheet and web stock such as corrosion resistant lacquers on sheet metal can stock, glass and synthetic fibre sheet, such as nylon, fabric combinations of nylon web and paper pulp and the like by exposure to radiant surface temperatures where desirable considerably above the ignition temperatures of the evolved combustible vapors when diffused in air at greatly increased speeds and without exposing the web, sheet or fabric under treatment to direct flame contact, excessive temperatures or other deteriorating or damaging conditions. This is accomplished by exposing the material under treatment to radiant energy heating zones in which radiator temperatures up to 4000° F. or higher may be utilized depending upon the material under treatment. For example, radiator temperatures of the order of 500° F. to 1500° F. and higher may quickly vaporize the low temperature volatile and most readily combustible constituents that may be embodied in the material under treatment. These constituents are removed from the heating zone without ignition even though the radiators may be operating far above the normal ignition temperatures of the evolved vapors, by maintaining the atmosphere of the high temperature zone incapable of supporting combustion, and timing the run of the material through the hot zone in a manner to prevent injury to the web. So long as liquid volatile constituents are being vaporized the temperature of the material cannot rise above the vaporizing or boiling temperatures of volatile constituents to be removed. After removal of the lower vaporizing point, more combustible, volatiles the speed of material may be reduced through successive radiant heating zones to speed the removal of higher boiling, higher ignition point, volatiles and sublimates without raising the temperature of the web, sheet or fabric under treatment sufficiently high to damage it, by control of the atmosphere of the heating zones depending upon the character of the material under treatment, the economics of the operation and the desirability of maintaining neutral, oxidizing or reducing atmospheres, or utilization or elimination of convection in the heating and curing processes. Where such high temperatures are used, for example, in removing yarn size material from glass fabric, radiant burners heating only one side of the material may be used since the temperature drop across the material will be relatively slight, thus effecting large savings on fuel and equipment heretofore used in such operations.

An embodiment of apparatus for effecting my improved zonal treatment of web, sheet and fabric materials is illustrated in FIGURE 14, in which fabric 250 to be treated is shown entering an embodiment of my improved apparatus through opening 251 (preferably roller sealed as hereinafter described in detail in FIGURE 15C) in housing 252. The fabric is driven by a series of rollers 254(a–e), each powered independently by motors, and a series of radiators 255(a–e) one of which is positioned between each of rollers 254(a–e). Radiators 255(a) and (e) have single inner radiating sides and outer insulation covers 256 while radiators 255(b, c, and d) have double radiating surfaces of equal or varying lengths as desired. The fabric 250 is initially threaded through the apparatus over all of rollers 254(a–e) as indicated by dotted line 258, and out through opening 257. Thereafter, end roller 254(a) is started and runs at the predetermined roller speed while the remaining rollers remain idle, thus creating a fabric festoon between rollers 254(a) and 254(b) which grows downwardly between the first pair of radiators 255(a–b) until it meets and actuates switch 260(a) or other sensitive switch mechanism. Switch 260(a) energizes the motor or other suitable driving mechanism (not shown) thereby starting rotation of roller 254(b) to form a festoon between rollers 254(b) and 254(c) until fabric 250 trips switch 260(b) to start roller 254(c). This operation is repeated successively until all rollers are in operation and the fabric is passing through the apparatus in the form of succeeding festoons draped between each pair of rollers with the outer surfaces only of the vertical legs of each festoon exposed to radiant heating. The linear surface speed of the rollers is uniform, and the speed of the sheet, web or fabric is correlated with the festoon sizes and the operating radiator temperatures so that it will be subjected to the desired amount of heat as it passes through each festoon of the apparatus. The festoons may be of equal length or of varying sizes according to the speed desired for the particular run through each radiant heating zone.

Thus, the speed of fabric travel through the radiant heating zones of the apparatus used in the coronization of glass fabric for example is controlled by the speed of rollers 254(a–e) and the size of the festoons formed between the rollers. The initial festoon between radiators 255(a) and 255(b) is relatively small and the fabric will therefore quickly pass through the initial radiation zones while being heated to an extent sufficient to remove the more volatile constituents from the size material. Thereafter, the festoon sizes are correlated to provide the desired exposure time and heating of the fabric to radiators 255(*b–e*) to remove the higher vaporizing temperature volatiles. Switches 260(*a–d*) control the speed of rollers 254(*b–e*) to maintain the size of the festoons so that the fabric will be adjacent the desired amount of radiator surface between each pair of rollers, and consequently regulate the speed of the fabric.

The spacing of the control switch mechanisms below the driving rollers may be uniform or varied to provide equal or differing festoon lengths to provide equal or differing relative times of passage of the material through the successive radiation zones depending upon the material to be treated. And the types of radiators in each section may be selected in accordance with the zonal temperatures and other conditions desired as the treatment of the material proceeds. For certain types of operation, radiator temperatures up to about 800° F. are required. For these, my improved radiators, utilizing high temperature heat transfer liquid media such as disclosed in FIGURES 11 and 12, may be used. For higher zonal temperature operation well known types of gas burning radiators may be used such as flame heated imperforate metal panel type radiators. For still higher zonal temperature radiating surfaces operating up to 1500° F. or higher, gas burning perforated ceramic tile operating between about 1600° F. to 2200° F. or higher (as for example the well known panel or muffle type radiators, or Perfection-Schwank type perforated ceramic tile gas burning radiators described in United States Patent No. 2,775,294 and the like) may be used. The Perfection-Schwank type burners function entirely on controlled gas and primary air with complete fuel combustion and evolution of fully oxidized combustion products which are discharged from the radiating surfaces and are incapable of supporting combustion of the evolved volatiles. These hot gases emit radiant energy and may also be used for added convection heating of products which are not sensitive to the evolved gases.

For still higher temperature operation electrically heated radiators such as resistance bar and filament heated bulb and quartz tube radiators that operate up to 4000° F. and higher may be used.

As diagrammatically shown in FIGURE 15A a manifold exhaust plenum 266 may be formed by a wall 267 provided with exhaust openings 268 (FIGURES 14 and 15A) selectively closeable by shutters 268(*a*) operable from outside the housing by any suitable mechanism (not shown). Openings 268 and shutters 268(*a*) are positioned adjacent each radiator and between each pair of rollers for withdrawal of the radiator products of combustion when present, and the vapors evolved from the heated material. An exhaust power fan 269 diagrammatically illustrated positioned on the outer wall of plenum 266 in any suitable manner (not shown), is provided for venting the plenum to atmosphere or a vapor collecter depending upon the nature of the evolved vapors.

Depending upon the results desired, the shutters 268(*a*) may be regulated to produce only a slight vacuum incidental to withdrawal of the vapors and products of combustion when present, from the plenum chamber, or to produce a relatively high vacuum to insure removal of combustible vapors (and combustion products from Perfection-Schwank type radiators when used) in one or more of the heating zones. Also, if desired, tower structures as described above in connection with FIGURES 1–8 may be provided for one or more festoon zones to effect faster vapor removal by venting streams of air across the web, sheet or fabric, or if desired, to introduce inert gas into the heating zone to further insure against combustion of the material on the fabric.

Radiators 255(*a–e*) or the opposite sides of radiators 255(*b, c,* and *d*) may be operated at differing temperatures for the treatment of differing materials, and the speed of material passage through the different radiation zones, and the zone atmospheres may be controlled to remove all of the combustible volatiles without ignition at maximum linear speeds of passage of the material under treatment. For example in the treatment of materials having volatilizable combustibles of differing ignition temperatures to be removed, the festoon and radiation zone lengths, linear speeds and atmospheric conditions may be selected and controlled to provide exposure times such that the radiators may be operated at uniform temperatures well in excess of the ignition temperatures of the combustible volatile constituents to effect complete removal of volatiles without combustion.

FIGURE 15B illustrates another festoon heat treating apparatus in which the festoons are all of equal length. Double faced radiators 269*a* and single faced end radiators 270 are positioned adjacent the festoon runs as illustrated. Variable speed rollers 271 are individually controlled by switches 272.

FIGURE 15C is an enlarged view of the roller seal means 278 comprised of a pair of rollers 279 biased together by springs 280. A suitable resilient sealing flap 281 extends from the housing over a portion of each roller.

Fabric is frequently finished for commercial purposes in a padding system. As diagrammatically illustrated in FIGURE 16, a further embodiment of the present invention exemplifies still another use of vertically arranged radiant heaters which effect rapid removal of moisture or solvent from sheet material to increase processing efficiency and effectiveness. The apparatus and method of this embodiment are particularly suited for treating fabric, web and sheet materials such as dyeing with either vat, disperse or fiber reactive dyes, impregnating or coating with plastics, rubber, or thermosetting resins, and similar processes that require treatment of the sheet material with a fluid and exposure to heat.

A series of radiant heater elements 300 of the type shown in FIGURES 11 and 12, or other suitable radiators are arranged in vertical rows above padders 304, 308, and 312. Each vertical row of heaters depending on the types of radiators used may utilize a single relatively large heating panel, or a bank of smaller radiators joined as diagrammatically illustrated in FIGURE 13.

Taking a coronized glass fabric dyeing process as an example, the desized fabric 324 leaving muffle furnace 326 passes around tension rolls 327 and 328 into padder 304 where it is guided by external rolls 332 and internal roll 334. Next the material, guided by rollers 335 enters and passes between four successive pairs of radiator elements 300 guided by rollers 336 and 340. Between each pair of radiator elements the material is heated and/or dried at the desired processing temperatures for the particular padding operation involved. The fabric continues its run in a similar fashion through padders 308 and 312 and the associated radiation zones and then enters a washer unit 344 such as a Williams washer. The material leaves the washer saturated with water and passes through a last series of radiator elements 300 and into an accumulator 348 which is a series of spaced apart rollers 352 for storing the material for final winding. From accumulator 348 the material passes through guides 355 and into the finish winders 356.

Any number of padders may be used as desired and any of the padders shown may be by-passed if desired. Hood 358 over the padding and drying assembly collects the products of vaporization and vents them through a suitable vent opening such as 360. It is preferred that the entire enclosure be substantially air tight to minimize convection heat losses.

Instead of enclosing the padding system in a housing as in FIGURE 16, the heating elements between the padders or other treating devices may be individually enclosed in separate chambers. This arrangement is particularly desirable, for example, where the vapors developed from one padder solution might have an undesirable effect on the fabric in subsequent treating stages.

Figure 19:
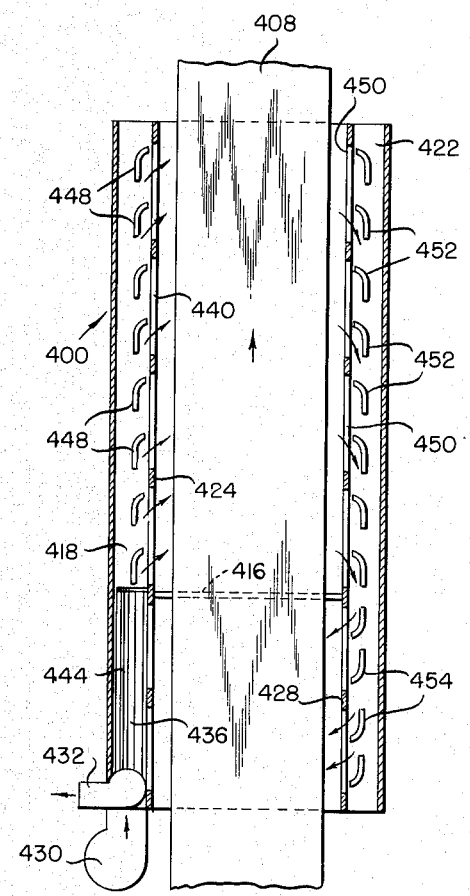
FIGURE 19 is a vertical section view taken along line 19—19 of FIGURE 18, the radiators being left out for clearer illustration of the other elements; and, FIGURE 20 is a sectional diagrammatic view of an improved compartmentalized continuous treating furnace for web and sheet material which are non-tacky on the sides that contact with supporting rollers and require treatment.
Figure 18:
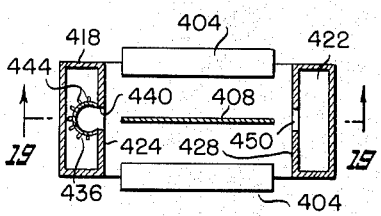
FIGURE 18 is a horizontal section view taken substantially along line 18—18 of FIGURE 17.

In another modification of this invention illustrated diagrammatically in FIGURES 17-19 a single leg vertical muffle furnace 400 is shown which is particularly suited for glass fabric sizing removal by flameless oxidation cleaning.

Two, or more, muffle zones are established in the furnace. In the first zone, the most highly combustible and flammable volatile constituents of the material being treated are removed while in the subsequent zone the material is exposed to higher temperatures and the less volatile constituents are removed.

Schwank, muffle, or other infrared type gas heaters 404 are preferably provided in vertical banks on opposite sides of material 408 which is guided through the furnace by any suitable means, rolls 410 and 412, for example. The direction of travel of material 408 through the furnace and the zone position may be reversed if desired although the arrangement illustrated wherein the material travels upwardly reduces convection heat losses.

In the first relatively short muffle zone highly combustible volatiles are removed from material in a substantially inert atmosphere. The atmosphere, length of zones, and temperature of the radiators and speed of travel of the material are so related that, in coronization of sized glass fabric, for example, the lower temperature sizing volatiles will evaporate or volatilize preferably at radiator temperatures above the ignition temperature of the volatile materials to speed their evolution. In the second longer muffle zone less combustible volatiles are removed at higher temperatures under controlled atmospheric conditions with flameless oxidation of the remaining volatile constituents and impurities in the fabric to provide improved fabric strength and colors. Schwank type gas heated radiators are especially suited for use in furnace 400 as they normally operate at about 1600–1700° F., and the completely oxidized products of combustion are discharged through the radiant hot perforated plates as inert gases directly into the furnace zones and inhibit ignition and burning of the volatiles on the fabric which results in discoloration and weakening of the fabric.

Furnace 400, in its preferred form illustrated in FIGURES 17-19 is a vertical tower-like structure having oppositely located plenum chambers 418 and 422 formed by plenum walls 424 and 428, respectively, extending throughout the length of the furnace.

Blowers 430 and 432 are connected with plenum 418 and adapted to deliver air or inert gases thereto, and to exhaust the volatilized material and gases from the first muffle zone, respectively. A vertical heat exchanger 436, closed at its top adjacent partition 416, has a suction applied thereto by blower 432 to exhaust the first muffle zone gases and volatiles through longitudinal opening 440 which extends throughout the length of plenum 418 in plenum wall 424. The hot gases passing through the heat exchanger heat external vertical fins 444 thereon. Gas introduced by blower 430 into plenum 418 passes through the lower portion thereof in heat transfer contact with heat exchanger 436 and fins 444 and is thereby preheated prior to being deflected out through plenum opening 440 by curved vanes 448 across the second muffle zone.

A longitudinal opening 450 in plenum wall 428 extends throughout the length of plenum 422 and is adapted to receive the gases and evolved vapors in the second muffle zone, whether or not air or other gas is being introduced in the second zone through plenum 418 since blower 432, or another blower suitably located creates a suction in plenum 422. Downwardly curved deflector vanes 452 and curved guide vanes 454 are adapted to guide the vapors and gases from the second to and across the first muffle zone when it is desired to utilize the less volatile constituents removed in, and the substantially inert products of combustion produced by, the gas burning infra-red radiators in the second zone as a combustion inhibiting atmosphere in the first zone.

When it is desired to facilitate flameless oxidation and insure complete volatile removal, oxygen or oxygen containing gases may be passed through the second zone. By using Schwank radiators this may be easily done by supplying excess air with the fuel supplied to the radiators and introduction thereof through blower 430 through plenum 418 is unnecessary. Such oxygen, or oxygen containing gas emanates from the hot inner surface to the radiator and is thereby exposed to the fabric. Alternatively, air or other oxygen containing gases may be introduced into the second zone through plenum 418 and gas inlet opening 440 in furnace plenum wall 424. In either case the gas is heated prior to entering the second zone either by heat exchanger 436, or by the radiators.

The evolved volatiles (and gases of combustion when a Schwank or similar type burner is used) are drawn across the flat surfaces of the fabric and removed from both first and second muffle zones. The sweeping flow of gases across the fabric prevents outward migration of evolved volatiles toward the radiators and thereby further insures against combustion thereof.

The substantially inert, or combustion inhibiting atmosphere maintained in the first muffle zone is in accordance with this invention, conveniently provided by channeling the hot products of combustion and evolved volatiles that are removed from the second muffle zone and which are substantially incapable of supporting combustion, through opening 450 in plenum 422, guided by vanes 452 and 454 as shown by flow arrows, into the first muffle zone.

The resultant conservation and use of the gaseous second zone by-product eliminates the cost of using an inert gas such as nitrogen to prevent combustion of the highly combustible materials present in the fabric in the first zone, and of preheating such gas, thereby giving increased efficiency and lower operating costs. As the gas vapor mixture is drawn from plenum 422 across material 408 additional vapors are picked up and removed from the first zone through vertically finned heat exchanger tube 436 and blower 432 in the portion of plenum 418 adjacent the first muffle zone without burning on the fabric surface and are exhausted.

It should be understood that the basic advantage of increased processing speeds accomplished by the vertical single leg furnace results from the elimination of catenary curvature in the fabric which limits the feasible length of web and fabric treating furnaces, and from my improved plural zone treatment wherein the more combustible lower temperature volatiles are removed in the first zone, and the remaining higher temperature volatiles and impurities removed by flameless oxidation in the subsequent zone or zones.

Direct radiation of the fabric by radiating surface temperatures considerably above the volatilization and ignition temperatures of the combustible constituents of the material produces rapid evolution of the volatiles from the fabric in an environment of flame inhibiting atmosphere with cross ventilated removal of the volatiles as they are evolved, and controlled movement of the fabric through the heating zones, prevents discoloration and weakening of the fabric due to deleterious surface combustion on the fabric. The environment and rapid withdrawal of the volatiles and products of combustion from the radiators in a sweeping lateral pass across the fabric prevents substantial migration of the volatiles toward the high temperature radiator surfaces and surrounds them with the inert products of combustion or other inert gases which may be supplied when panel type radiators or the like are used without utilization of the combustion products to provide the inert combustion inhibiting atmosphere.

The heater and direction changing pulley arrangements illustrated in FIGURES 16 and 17 are very practical when the sheet-like product does not contain material that will deposit or build up on rollers. However, certain types of sheet materials such as fabrics or paper coated with tacky or wet material on only one side must necessarily be dried or rendered non-tacky prior to contacting the coated surface thereof with pulleys or drums. Usually these materials are also difficult to thread through a drier for smooth running operation.

In another modification of the present invention radiant heat may be applied by the apparatus illustrated in FIGURES 14 and 15B to any suitable number of loops of sheet material having a wet or tacky side which never contacts a roller and yet passes through fields of radiant heat produced by horizontally spaced, vertical radiator panels.

In the embodiment of my invention illustrated in FIGURE 20, non-tacky materials such as sized glass fabric and materials having a wet or tacky side such as webs coated with thermosetting plastic may be continuously treated. The apparatus in this embodiment comprises a housing 460 with an inlet opening 462 having pairs of lower idler rollers 464, and upper rollers 466 driven in any well known manner (not shown) and preferably provided with a roller sealed outlet 278 such as is illustrated in FIGURE 15C.

The fabric to be treated is threaded through entrance opening 462 with its dry side engaging and guided by the left pair of lower rollers 464 and then successively around upper driven rollers 466 and the remaining pairs of lower rollers 464 out through the exit seal 278.

A partition 468 with slotted openings 470 for passage of the sheet material 250 from and to rollers 464 divides the chamber into a lower and upper compartment. Single radiating face heaters or heater banks 472 are mounted against the housing end walls. Walls 474 and their end supports extend vertically between the partition 468 and the hooded top 476 of the housing forming pairs of vertical compartments or towers housing the up and down fabric legs supported and driven by each roller 466. Vertical radiant heaters or heater banks 478 are supported from the side walls of housing 460 centrally of each roller 466.

The evolved vapors, and combustion products when radiant heaters of the Perfection Schwank type are used, are withdrawn through stacks 480 under control of dampers 482 in well known manner.

In operation of this embodiment, a fabric 250 to be treated, is threaded from housing entrance 462 around the rollers in the housing as illustrated and out through outlet 278. The wet or tacky side, if any, faces downward on entering inlet 462. As the fabric moves upward between the first heater banks 472 and 478 the wet surface is dried or cured to the non-tacky stage before it reaches the first driven roller and then passes through the remaining tower or compartment portions in succession with each vertical fabric leg subjected to radiant heating on opposite sides until it is between the radiant heaters 472 and 478 until it exits at 278.

The temperatures of the radiant heaters in each compartment and the furnace atmospheres may be controlled in accordance with the types and nature of the webs and fabric under treatment and the nature of their coatings or impregnations in manners hereinbefore set forth in connection with the other embodiments of invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A process for removing a volatile substance from sheet material, comprising the steps of:
    (a) passing the sheet material from which the volatile substance is to be removed through an elongated enclosed structure;
    (b) applying sufficient radiant energy to said sheet material as it passes through said structure to substantially completely volatilize said substance and thereby render said material non-tacky before it exits from said structure without significant additional heat energy;
    (c) introducing heated gas into said structure to entrain and dilute said substance; and
    (d) exhausting said gas and the entrained substance from said structure;
    (e) said radiant energy being provided directly from at least one primary source which is located adjacent said material and which has a substantially uniform pattern of radiant energy emission, said source being at a temperature substantially higher than the boiling point of the volatile substance and the application of radiant heat and the rate of movement of the material through said structure being so co-ordinated that the last of said volatile substance is not evolved from said material until it is substantially at the exit from said structure to prevent said material from being heated to a temperature above the boiling point of said volatile substance even though said radiant energy source is operated at a substantially higher temperature;
    (f) said heated gas being introduced into said structure at a temperature approximately equal to the boiling point of the volatile substance to avoid the addition of significant additional heat to and the overheating of said material and to simultaneously prevent said gas from extracting heat from and thereby cooling the evolved substance;
    (g) the heated gas introduced into said structure being directed in a path normal to the direction of movement of said material and substantially in the plane of said material at a sufficiently high velocity to scour the evolved volatile substance from adjacent said material and thereby increase the rate of radiant heat transfer to said web and the rate of removal of the volatile substance therefrom by preventing the formation of a stagnant insulating layer of the evolved volatile substance adjacent said material; and
    (h) said gas being exhausted from said structure after it has made a single pass across said material.

2. The process as defined in claim 1:
    (a) wherein said sheet material is passed through a plurality of heating zones each provided with at least one radiant energy source in said structure; and
    (b) including the steps of:
    (c) forming said material into free-hanging festoons in each of said zones; and
    (d) independently regulating the length of the festoons in each of said zones to control the rate of movement of said material through and the heat imparted to said material in each of said zones.

3. The process as defined in claim 1:
    (a) wherein said sheet material is passed through a plurality of heating zones each provided with at least one radiant energy source in said structure;
    (b) including the step of generating combustion products in at least one of said zones; and
    (c) wherein the heated gas introduced into the initial one of said zones consists of evolved volatiles and combustion products exhausted from the zone in which said combustion products are generated.

4. The process as defined in claim 1:
    (a) wherein said sheet material is passed through a plurality of heating zones each provided with at least one radiant energy source in said structure;
    (b) wherein the heated gas introduced into at least one of said zones includes oxygen for the oxidation of volatiles evolved from the material in said zones; and (c) including the step of preheating the oxygen-containing gas before it is introduced into said zone by bringing it into heat transfer relationship with the gas and evolved volatiles exhausted from another of said zones.

5. The process as defined in claim 1, together with the preliminary steps of:

(a) heating said sheet material; and
(b) thereafter passing said sheet material through an impregnant dissolved in a non-aqueous solvent to impregnate at least one surface of said sheet material.

6. The process as defined in claim 1, together with the step of so controlling the composition and introduction of the heated gas into said structure as to provide an atmosphere incapable of supporting combustion of said volatile substance adjacent said sheet material.

7. Apparatus for treating web material comprising:

(a) means for applying a volatile constituent to said web;
(b) a housing having at least one pair of radiant heater units oriented to emit radiant energy toward each other;
(c) means for passing said web material through said housing between said radiant heaters to volatilize said constituent;
(d) gas supply means for introducing a heated gas into a side of said housing facing an edge of said web at a high velocity to dilute the evolved constituent;
(e) flow guiding means in said housing for directing the heated gas introduced therein into a path normal to the direction of movement of said web and substantially in the plane of the web to scour evolved volatiles from adjacent said web and thereby increase the rate of radiant heat transfer to said web by preventing the formation of an insulating layer of evolved volatiles thereadjacent; and
(f) means communicating with the interior of said housing through the opposite side thereof for exhausting said gas and the evolved volatiles from said housing;
(g) said gas supply and exhaust means including gas inlet and outlet ducts on said opposite sides of and extending the length of said housing; and
(h) said ducts being oppositely tapered in size throughout their length to insure a uniform flow of said gas across said web throughout said housing.

8. The apparatus of claim 7:

(a) wherein there are plural pairs of said radiant heater units disposed in generally parallel spaced apart relationship defining plural heating zones; and
(b) gas supply and exhaust means for each of said zones; and
(c) including drive means for moving said web seriatim through successive ones of said heating zones, said drive means comprising means for individually regulating the period for which said material remains in each of said zones.

9. The apparatus of claim 8, wherein:

(a) said housing is horizontally elongated and said radiant heater units are vertically disposed therein to define vertically extending heating zones;
(b) there is a single row of web supporting rollers in said housing, there being a pair of rollers at the upper end of and at opposite sides of each of said heating zones for supporting said web in a free-hanging festoon in each of said zones; and
(c) said drive means includes means for individually driving each of said rollers, means including independently operable switch means in each of said zones adapted to be contacted and operated by said festoons, and means controlled by said switches for independently regulating the length of each of said festoons by controlling the speed of the pair of rollers between which each of said festoons is formed.

10. Apparatus as defined in claim 7, together with preheater means for reducing the moisture content of said web prior to the application of the volatile constituent thereto.

References Cited by the Examiner

UNITED STATES PATENTS

| 411,836 | 10/1889 | Proctor | 34—159 |
|---|---|---|---|
| 1,308,951 | 7/1919 | Jacobs | 34—157 |
| 1,470,650 | 10/1923 | P. S. Smith | 34—23 |
| 1,530,064 | 3/1925 | Walsh | 34—68 |
| 1,596,671 | 8/1926 | Lionne. | |
| 1,722,797 | 7/1929 | Jessup | 34—18 |
| 1,901,306 | 3/1933 | Knowlton | 34—157 |
| 1,947,546 | 2/1934 | Reading | 34—86 |
| 1,987,250 | 1/1935 | Wenzel | 34—157 |
| 2,050,977 | 8/1936 | E. L. Smith | 34—159 |
| 2,083,423 | 6/1937 | Bennett | 34—48 |
| 2,542,064 | 2/1951 | Tilden | 34—155 |
| 2,559,713 | 7/1951 | Dunski | 34—18 |
| 2,578,744 | 12/1951 | Rusca | 34—18 |
| 2,633,428 | 3/1953 | Klug | 117—126 |
| 3,029,778 | 4/1962 | Kaplan et al. | 34—155 |

WILLIAM F. O'DEA, *Primary Examiner.*

NORMAN YUDKOFF, *Examiner.*